United States Patent
Hsu et al.

(10) Patent No.: US 8,776,363 B2
(45) Date of Patent: Jul. 15, 2014

(54) METHOD FOR SUPPORTING SEMICONDUCTOR WAFER AND WAFER SUPPORTING ASSEMBLY

(75) Inventors: Chang-Sheng Hsu, Hsinchu (TW);
Li-Che Chen, Pingtung County (TW);
Kuo-Yuh Yang, Hsinchu County (TW);
Chia-Wen Lien, Taoyuan County (TW);
Yan-Da Chen, Taipei (TW)

(73) Assignee: United Microelectronics Corp., Science-Based Industrial Park, Hsin-Chu (TW)

( * ) Notice: Subject to any disclaimer, the term of this patent is extended or adjusted under 35 U.S.C. 154(b) by 71 days.

(21) Appl. No.: 13/479,253

(22) Filed: May 23, 2012

(65) Prior Publication Data

US 2013/0312246 A1    Nov. 28, 2013

(51) Int. Cl.
*H05K 3/36*     (2006.01)

(52) U.S. Cl.
USPC ............... 29/830; 29/829; 29/825; 29/592.1; 414/935; 414/936; 414/941; 269/8

(58) Field of Classification Search
USPC ......... 29/830, 829, 825, 592.1; 414/935, 936, 414/941; 269/8; 335/285
See application file for complete search history.

(56) References Cited

U.S. PATENT DOCUMENTS 2,991,347 A * 7/1961 Weinstein ................. 219/85.16
5,224,581 A * 7/1993 Ebbing et al. ............. 198/345.1

* cited by examiner

*Primary Examiner* — Peter DungBa Vo
*Assistant Examiner* — Azm Parvez
(74) *Attorney, Agent, or Firm* — Winston Hsu; Scott Margo

(57) ABSTRACT

A method for supporting a semiconductor wafer includes providing a device wafer to a magnetizable ring, providing a magnetizable carrier to the device wafer, and magnetizing the magnetizable ring and the magnetizable carrier to form a magnetized clamp having a magnetized ring and magnetized carrier. The magnetized clamp securely clamps the device wafer therebetween.

11 Claims, 4 Drawing Sheets

METHOD FOR SUPPORTING SEMICONDUCTOR WAFER AND WAFER SUPPORTING ASSEMBLY

BACKGROUND OF THE INVENTION

1. Field of the Invention

The present invention relates to a method for supporting semiconductor wafer and a wafer supporting assembly, and more particularly, to a method for supporting semiconductor wafer and a wafer supporting assembly for thin wafer.

2. Description of the Prior Art

Semiconductor wafers serve as a basic material for constructing integrated circuits (ICs). In some applications, the semiconductor wafers are thinned down for the fabrication of IC devices. The thinned wafers have advantages of improved heat dissipation, better electrical operation of the fabricated IC devices, and reduced device capacitance. In other applications the wafer is further thinned down for 3D-integration bonding and for fabricating through-silicon-via (TSV) structures.

However, it is very difficult to handle the thinned semiconductor wafer without support. As for wafer thickness of less than 200 micrometer, even less than 100 micrometer, it becomes increasingly difficult to mechanically hold the wafer and to maintain control of the planarity and integrity during processing.

Therefore, a method for supporting semiconductor wafer and a wafer supporting assembly for the thinned wafer is always in need to overcome the aforementioned problems.

SUMMARY OF THE INVENTION

According to an aspect of the present invention, a method for supporting a semiconductor wafer is provided. The method includes providing a device wafer to a magnetizable ring, providing a magnetizable carrier to the device wafer, and magnetizing the magnetizable ring and the magnetizable carrier to form a magnetized clamp having the device wafer clamped therebetween.

According to another aspect of the present invention, a wafer supporting assembly is provided. The wafer supporting assembly includes a device wafer and a magnetized clamp. The device wafer is clamped in between the magnetized clamp which includes a magnetized ring and a magnetized carrier. The magnetized ring and the magnetized carrier attract each other by a non-contact force.

According to still another aspect of the present invention, a wafer supporting assembly is provided. The wafer supporting assembly includes a magnetized ring and a magnetized carrier. The magnetized ring and the magnetized carrier are attracted to each other by a non-contact force.

According to the method for supporting the semiconductor wafer and the wafer supporting assembly provided by the present invention, the magnetizable ring and the magnetizable carrier are magnetized and thus to clamp the device wafer therebetween. Consequently, the device wafer is supported and carried to following processes without any chemical adhesive. More important, the device wafer is securely supported during processes of high temperature, in which the adhesive material cannot sustain.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIGS. 1-6 are schematic drawings illustrating a method for supporting a semiconductor wafer provided by a preferred embodiment of the present invention, wherein FIG. 2 is a schematic drawing in a step subsequent to FIG. 1, FIG. 3 is a schematic drawing in a step subsequent to FIG. 2, FIG. 4 is a schematic drawing in a step subsequent to FIG. 3, FIG. 5 is a schematic drawing in a step subsequent to FIG. 4, and FIG. 6 is a schematic drawing in a step subsequent to FIG. 5.

DETAILED DESCRIPTION

Figure 1:
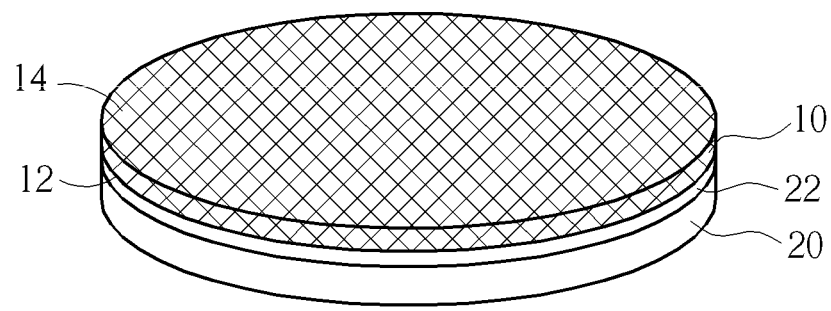

Please refer to FIG. 1-6, which are schematic drawings illustrating a method for supporting a semiconductor wafer provided by a preferred embodiment of the present invention. As shown in FIG. 1, the preferred embodiment provides a device wafer 10 having a first side 12 and an opposite second side 14. The device wafer 10 can be semiconductor wafer such as a GaAs wafer, a silicon wafer, or any other semiconductor wafer. And the device wafer 10 includes a plurality of devices (not shown) for constructing ICs formed in the first side 12. In other words, the first side 12 of the wafer 10 is a front side which includes the devices formed thereon and the second side 14 is a back side. Then, the device wafer 10 is flipped over and bonded to a carrier wafer 20 by an adhesive layer 22. The carrier wafer 20 includes an insulating material such as silicon, glass, sapphire, quartz or any other suitable material. A diameter of the carrier wafer 20 can be the same with or slightly larger than a diameter of the device wafer 10 for supporting the device wafer 10 and preventing edges of the device wafer 10 from cracking. The device wafer 10 is chemically adhered to the carrier wafer 20 by the adhesive layer 22, which can be chemically dissolved, thermally decomposed, or decomposed via radiation. It is well-known to those skilled in the art that most of materials used to form the adhesive layer 22 cannot sustain temperatures higher than 260° C.

Please still refer to FIG. 1. Next, the device wafer 10 is transported for the required process such as a thinning or grinding process. Such process is performed to the second side 14 of the device wafer 10. Since the carrier wafer 20 securely supports the device wafer 10, the device wafer 10 is prevented from breaking or cracking after thinning down to a wafer thickness less than 200 micrometers (μm).

Figure 2:
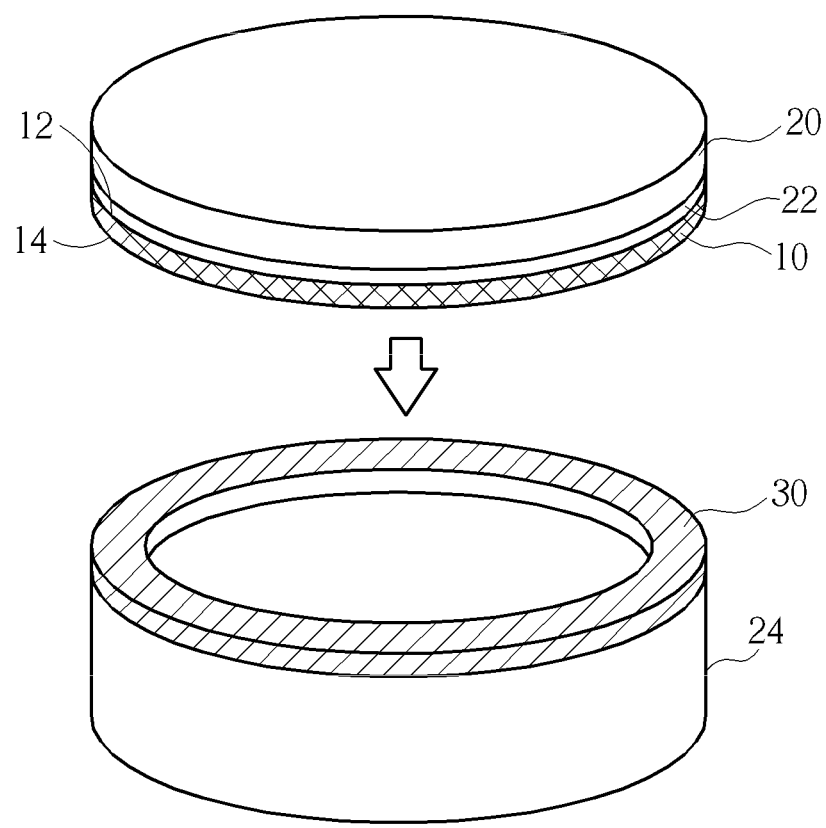

Please refer to FIG. 2. After performing the required process, the thinned device wafer 10 is flipped back and provided to a vacuum chuck 24. It is noteworthy that a magnetizable ring 30 is placed on the vacuum chuck 24, and the device wafer 10 is provided to align with the magnetizable ring 30. Preferably, a diameter of the magnetizable ring 30 is the same with or slightly larger than the diameter of the device wafer 10 for supporting the device wafer 10 and preventing edges of the device wafer 10 from cracking.

Figure 3:
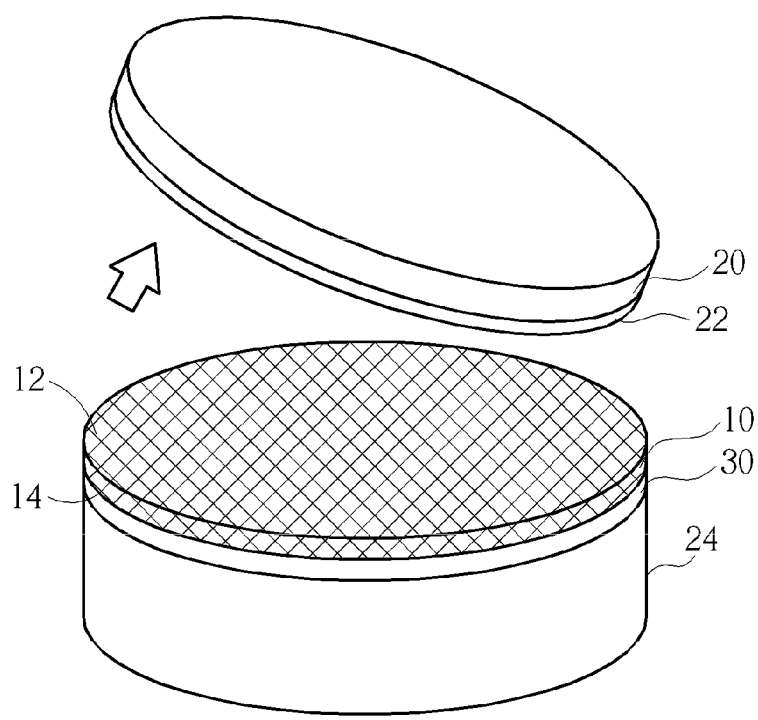

Please refer to FIG. 3. Next, a vacuum force is provided to hold the device wafer 10 and the magnetizable ring 30, and followed by removing the carrier wafer 20. As mentioned above, since the adhesive layer 22 can be chemically dissolved, thermally decomposed, or decomposed via radiation, a suitable solution, heat, or radiation such as UV is provided to dissolve or decompose the adhesive layer 22. Consequently, the carrier wafer 20 is removed from the device wafer 10 and thus the first side 12 of the device wafer 10 is exposed as shown in FIG. 3.

Figure 4:
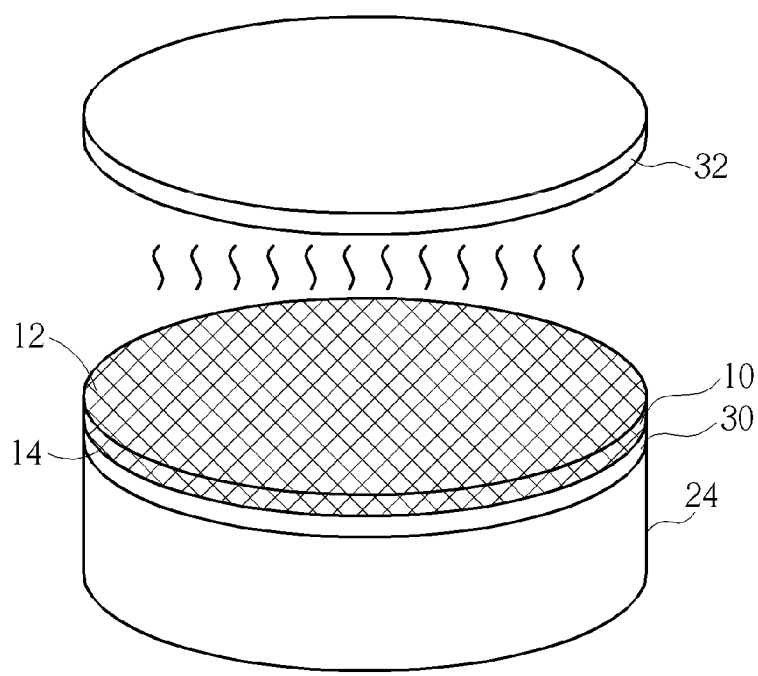
Figure 7:
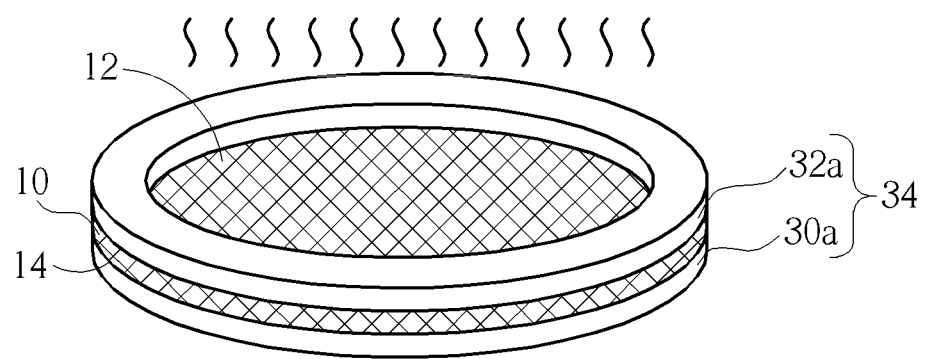
FIG. 7 is a schematic drawing illustrating a wafer supporting assembly provided by another preferred embodiment of the present invention.

Please refer to FIG. 4. After removing the carrier wafer 20 from the device wafer 10, a magnetizable carrier 32 is provided to the device wafer 10. As shown in FIG. 4, the magnetizable carrier 32 contacts the first side 12 of the device wafer 10. Preferably, a diameter of the magnetizable carrier 32 is the same with or slightly larger than the diameter of the device wafer 10. It is noteworthy that the magnetizable carrier 32 includes a magnetizable plate as shown in FIG. 4, or a magnetizable ring as shown in FIG. 7. More important, the magnetizable ring 30 and the magnetizable carrier 32 include a material having superior stable magnetization at a temperature higher than 400° C. For example, the magnetizable ring 30 and the magnetizable carrier 32 can include a ferrous material, but not limited to this.

Figure 5:
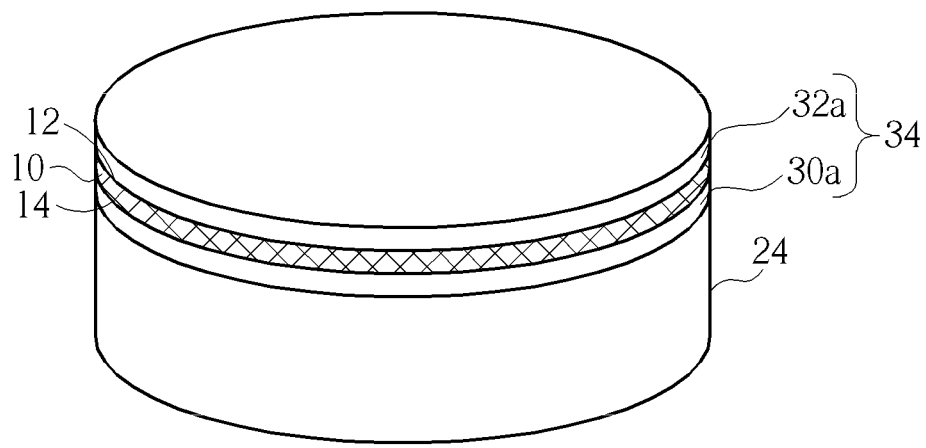
Figure 6:
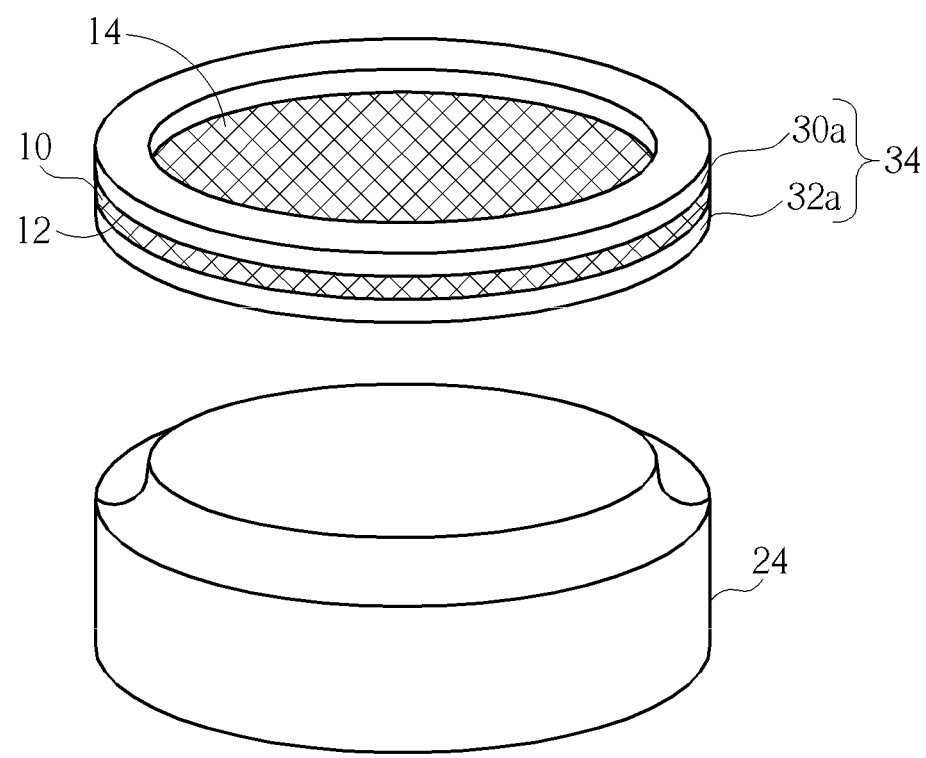

Please refer to FIGS. 5-6. Next, the magnetizable ring 30 and the magnetizable carrier 32 are magnetized to form a magnetized clamp 34 having the device wafer 10 clamped therebetween. In detail, the magnetized clamp 34 includes a magnetized ring 30a and a magnetized carrier 32a for clamping the device wafer 10. After forming the magnetized clamp 34, the vacuum force is released, thus the magnetized clamp 34 and the device wafer 10 are removed from the vacuum chuck 24 as shown in FIG. 6.

Please refer to FIGS. 6 and 7, wherein FIG. 7 is a schematic drawing illustrating a wafer supporting assembly provided by another preferred embodiment of the present invention. According to the preferred embodiment, the magnetizable carrier 32 can be a magnetizable ring, and thus the first side 12 of the device wafer 10 is exposed. Furthermore, since both of the first side 12 and the second side 14 of the device wafer 10 are exposed by the magnetizable rings 30/32, it is no longer in consideration that which side is the back side and which side is the front side having the device formed thereon of the wafer 10.

It is noteworthy that the present invention provides a wafer supporting assembly includes the device wafer 10 and the magnetized clamp 34. As shown in FIGS. 6 and 7, the device wafer 10 is clamped in between the magnetized clamp 34. Specifically speaking, by magnetizing the magnetizable ring 30 and the magnetizable carrier 32, a magnetic force which is a non-contact force, is generated between the magnetized ring 30a and the magnetized carrier 32a, and thus the magnetized ring 30a and the magnetized carrier 32a attracted each other by the magnetic force are obtained. The magnetized ring 30a and the magnetized carrier 32a respectively contact the second side 14 and the first side 12 of the device wafer 10 and to securely clamp the device wafer 10. In other words, the device wafer 10 is physically adhered to the magnetized clamp 34 by the non-contact magnetic force. It is noteworthy that since the magnetizable ring 30 and the magnetizable carrier 32 have the superior stable magnetization at high temperature, the magnetized ring 30a and the magnetized carrier 32a inherently maintain a stable magnetization at a temperature higher than 400° C., which means the support to the device wafer always sustains the high-temperature processes. Therefore the device wafer 10 clamped in and supported by the magnetized clamp 34 can be transported and performed in required processes such as process for fabricating TSV structures, under bump metallization (UBM), or redistribution layers (RDLs), which requires high temperature such as rapid thermal process (RTP), metal alloy formation . . . etc.

Furthermore, the magnetized clamp 34 can be easily removed from the device wafer 10. By demagnetizing the magnetized ring 30a and the magnetized carrier 32a, the magnetic force is released and thus the magnetizable ring 30 and the magnetizable carrier 32 are removed from the device wafer 10 when such support is no longer in need. More important, since the device wafer 10 is physically clamped in the magnetized clamp 34, no remnant adhesive material would remain on the device wafer 10 after removing the magnetized clamp 34, and thus the contamination is further avoided.

According to the method for supporting the semiconductor wafer and the wafer supporting assembly provided by the present invention, the magnetizable ring and the magnetizable carrier are magnetized and thus to clamp the device wafer therebetween. Consequently, the thin device wafer is supported and carried to following processes without any chemical adhesive. More important, the thin device wafer is securely supported during processes of high temperature, in which adhesive material cannot sustain.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for supporting a semiconductor wafer, comprising:
  bonding a device wafer to a carrier wafer, wherein the carrier wafer comprises an insulating material;
  providing the device wafer to a magnetizable ring after bonding the device wafer to the carrier wafer;
  providing a magnetizable carrier to the device wafer; and
  magnetizing the magnetizable ring and the magnetizable carrier to form a magnetized clamp having the device wafer clamped therebetween.

2. The method for supporting the semiconductor wafer according to claim 1, wherein the magnetizable carrier comprising a magnetizable plate.

3. The method for supporting the semiconductor wafer according to claim 1, wherein the magnetizable carrier comprising a magnetizable ring.

4. The method for supporting the semiconductor wafer according to claim 1, wherein the device wafer comprises a first side and an opposite second side.

5. The method for supporting the semiconductor wafer according to claim 4, wherein the first side of the device wafer contacts the carrier wafer and the second side of the device wafer contacts the magnetizable ring.

6. The method for supporting the semiconductor wafer according to claim 5, further comprising removing the carrier wafer from the device wafer before providing the magnetizable carrier.

7. The method for supporting the semiconductor wafer according to claim 6, wherein the magnetizable carrier contacts the first side of the device wafer.

8. The method for supporting the semiconductor wafer according to claim 1, wherein the carrier wafer comprises silicon or glass.

9. The method for supporting the semiconductor wafer according to claim 1, wherein the device wafer is chemically adhered to the carrier wafer by an adhesive layer.

10. The method for supporting the semiconductor wafer according to claim 1, wherein the magnetizable ring and the magnetizable carrier have a stable magnetization at a temperature higher than 400° C.

11. The method for supporting the semiconductor wafer according to claim 10, wherein the magnetizable ring and the magnetizable carrier comprise a ferrous material.

\* \* \* \* \*